United States Patent
Hikmet et al.

(10) Patent No.: US 12,397,498 B2
(45) Date of Patent: Aug. 26, 2025

(54) FDM PRINTED ITEM WITH DOPANT MATERIAL

(71) Applicant: SIGNIFY HOLDING B.V., Eindhoven (NL)

(72) Inventors: Rifat Ata Mustafa Hikmet, Eindhoven (NL); Ties Van Bommel, Horst (NL); Stefan Willi Julius Gruhlke, Baesweiler (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 411 days.

(21) Appl. No.: 17/775,536

(22) PCT Filed: Nov. 6, 2020

(86) PCT No.: PCT/EP2020/081222
§ 371 (c)(1),
(2) Date: May 9, 2022

(87) PCT Pub. No.: WO2021/094206
PCT Pub. Date: May 20, 2021

(65) Prior Publication Data
US 2022/0413201 A1     Dec. 29, 2022

(30) Foreign Application Priority Data

Nov. 14, 2019 (EP) .................................... 19209133

(51) Int. Cl.
*B29C 64/118*     (2017.01)
*B29C 64/209*     (2017.01)
(Continued)

(52) U.S. Cl.
CPC .......... *B29C 64/118* (2017.08); *B29C 64/209* (2017.08); *B29C 64/264* (2017.08);
(Continued)

(58) Field of Classification Search
CPC ..... B29C 64/118; B29C 64/209; B33Y 10/00; B33Y 70/10; B29K 2101/12; B29K 2105/251; B29K 2467/003; B29K 2505/02
See application file for complete search history.

(56) References Cited

U.S. PATENT DOCUMENTS

2001/0011779 A1*  8/2001  Stover .................... B29C 48/08
                                                   264/1.7
2013/0292881 A1   11/2013  Steiner et al.
(Continued)

FOREIGN PATENT DOCUMENTS

CN     108603062 A     9/2018
WO     2017040893 A1   3/2017
(Continued)

*Primary Examiner* — Jerzi H Moreno Hernandez

(57) ABSTRACT

The invention provides a method for producing a 3D item (1) by means of fused deposition modeling, the method comprising a 3D printing stage comprising layer-wise depositing an extrudate (321) comprising 3D printable material (201), to provide the 3D item (1) comprising 3D printed material (202), wherein the 3D item (1) comprises layers (322) of 3D printed material (202), wherein the method further comprises controlling a first temperature $T_1$ of the 3D printable material (201) within a first temperature range, wherein the 3D printable material (201) comprises a thermoplastic host material (401) and a dopant material (410) in the range of 1-20 vol %, the dopant material (410) comprising polymeric flake-like particles having a metal coating, wherein the 3D printable material (201) has an optical property that irreversibly changes from a low-temperature optical property to a high-temperature optical property when increasing a temperature of the 3D printable material (201) over a change temperature $T_c$, the optical property being selected from the group consisting of reflection, transmission, luminescence, absorption, and color, wherein the (Continued)

change temperature $T_c$ is within the first temperature range, wherein during at least a first part of the 3D printing stage the first temperature $T_1$ is below the change temperature $T_c$, and wherein during at least a second part of the 3D printing stage the first temperature $T_1$ is above the change temperature $T_c$.

8 Claims, 10 Drawing Sheets

(51) Int. Cl.
| | | |
|---|---|---|
| *B29C 64/264* | (2017.01) | |
| *B33Y 10/00* | (2015.01) | |
| *B29K 101/12* | (2006.01) | |
| *B29K 105/00* | (2006.01) | |
| *B29K 467/00* | (2006.01) | |
| *B29K 505/02* | (2006.01) | |

(52) U.S. Cl.
CPC .......... *B33Y 10/00* (2014.12); *B29K 2101/12* (2013.01); *B29K 2105/251* (2013.01); *B29K 2467/003* (2013.01); *B29K 2505/02* (2013.01)

(56) References Cited

U.S. PATENT DOCUMENTS

2015/0352789 A1* 12/2015 Haider .................. B29C 64/118
264/129
2018/0236712 A1* 8/2018 Hikmet ................. B29C 64/118

FOREIGN PATENT DOCUMENTS

| WO | 2018054724 A1 | 3/2018 | | |
|---|---|---|---|---|
| WO | 2018197376 A1 | 11/2018 | | |
| WO | 2018210602 A1 | 11/2018 | | |
| WO | 2019016022 A1 | 1/2019 | | |
| WO | WO-2019185361 A1 * | 10/2019 | ........... | B29C 64/118 |
| WO | WO-2019201671 A1 * | 10/2019 | ........... | B29C 64/118 |

\* cited by examiner

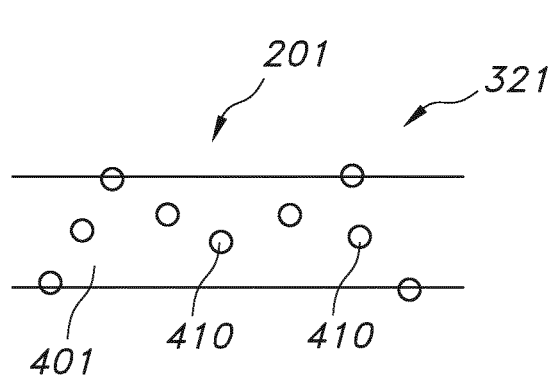
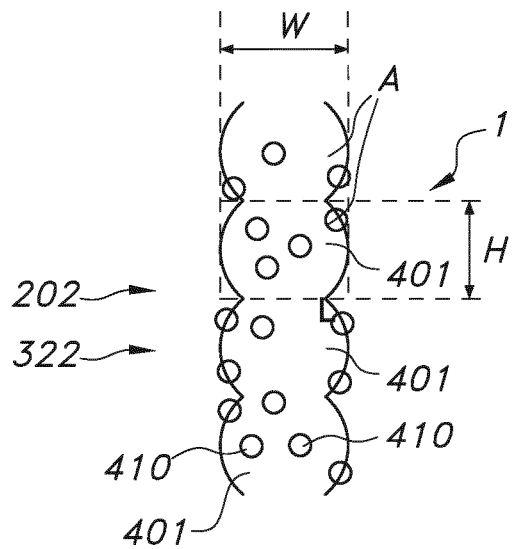
FIG. 3A  FIG. 3B
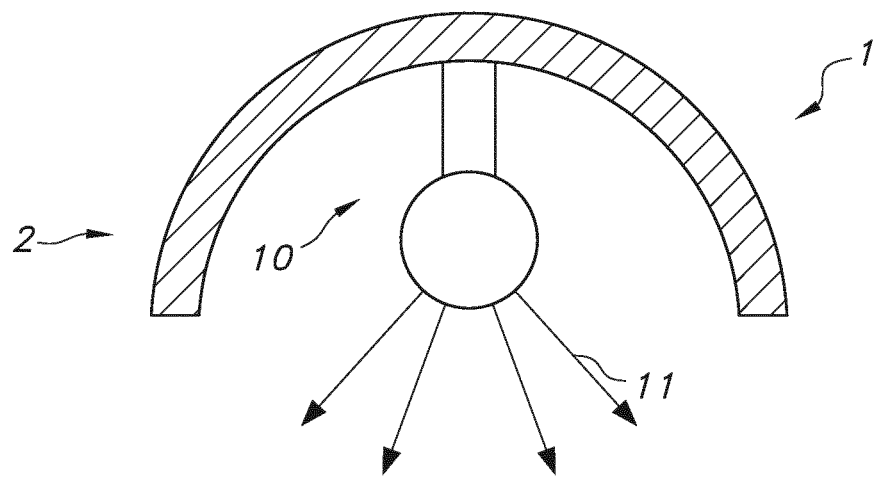
FIG. 4

FDM PRINTED ITEM WITH DOPANT MATERIAL

CROSS-REFERENCE TO PRIOR APPLICATIONS

This application is the U.S. National Phase application under 35 U.S.C. § 371 of International Application No. PCT/EP2020/081222, filed on Nov. 6, 2020, which claims the benefit of European Patent Application No. 19209133.8, filed on Nov. 14, 2019. These applications are hereby incorporated by reference herein.

FIELD OF THE INVENTION

The invention relates to a method for manufacturing a 3D (printed) item. Further, the invention may relate to a software product for executing such method. The invention also relates to the 3D (printed) item obtainable with such method. Further, the invention relates to a lighting device including such 3D (printed) item. Yet further, the invention may also relate to a 3D printer, such as for use in or for such method.

BACKGROUND OF THE INVENTION

The use of a thermoplastic polymer comprising a particulate filler for preparing 3D articles is known in the art. WO2017/040893, for instance, describes a powder composition, wherein the powder composition comprises a plurality of thermoplastic particles characterized by a bimodal particle size distribution, and wherein the powder composition may further comprise a particulate filler, antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent, fragrance, fiber, or a combination comprising at least one of the foregoing, preferably a colorant or a metal particulate. This document further describes a method of preparing a three-dimensional article, the method comprising powder bed fusing the powder composition to form a three-dimensional article.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

It may be desirable that 3D printed items have optical effects which may depend upon the part of the 3D printed item. For instance, it may be desirable that part is reflective and another part is less or substantially not reflective. Glitters are a class of materials which can give attractive appearance to luminaires. Glitters are produced by cutting e.g. polymer films, especially PET films, with a thin layer of aluminum into (substantially) flat particles with a precise size and shape (e.g. hexagon, rectangle star, triangle, circle etc). The films may also have microstructures (giving glitters an extra attractive appearance). For instance, in embodiments the glitters may be holographic glitters. However, when using glitters different optical properties may only obtained by using different 3D printable materials, i.e. a first material comprising or not comprising the glitters and a second material not comprising or comprising, respectively, the glitters. Likewise, this may apply to other types of additives that may impose optical effects to the 3D printable material. This may make the 3D printing complex more complex and/or more complex 3D printing apparatus may be necessary.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

In a first aspect, the invention provides a method for producing a 3D item by means of fused deposition modelling. The method comprises a 3D printing stage comprising layer-wise depositing an extrudate comprising 3D printable material, to provide the 3D item. The 3D item (thereby) comprises 3D printed material. Deposition may especially be done on a receiver item. The 3D item comprises layers of 3D printed material. The method further comprises controlling a first temperature $T_1$ of the 3D printable material within a first temperature range. The 3D printable material comprises a thermoplastic host material and a dopant material in the range of 1-20 vol %, wherein the dopant material comprises polymeric flake-like particles having a metal coating. The 3D printable material comprising the dopant material has an optical property that irreversibly changes from a low temperature optical property to a high-temperature optical property when increasing a temperature of the 3D printable material comprising the dopant material over a change temperature $T_c$. The change temperature is within the first temperature range. During at least a first part of the 3D printing stage the first temperature $T_1$ is below the change temperature $T_c$. Additionally, during at least a second part of the 3D printing stage the first temperature $T_1$ is above the change temperature $T_c$. Hence, in specific embodiments the invention provides a method for producing a 3D item by means of fused deposition modelling, the method comprising a 3D printing stage comprising layer-wise depositing an extrudate comprising 3D printable material, to provide the 3D item comprising 3D printed material, wherein the 3D item comprises layers of 3D printed material, wherein the method further comprises controlling a first temperature $T_1$ of the 3D printable material within a first temperature range, wherein the 3D printable material comprises a dopant material, wherein the 3D printable material comprising the dopant material has an optical property that irreversibly changes from a low temperature optical property to a high-temperature optical property when increasing a temperature of the 3D printable material comprising the dopant material over a change temperature $T_c$, wherein the change temperature is within the first temperature range. Especially, in embodiments during at least a first part of the 3D printing stage the first temperature $T_1$ is below the change temperature $T_c$, and wherein during at least a second part of the 3D printing stage the first temperature $T_1$ is above the change temperature $T_c$.

With such method it may be possible to create optical effects that differ over the 3D printed item. In principle, with a single type of material it may be possible to create one or more 3D printed parts that have an optical effect that differ from one or more other parts, whereas the material composition may substantially, or even essentially, be the same. This allows a relatively simple 3D printing method but also adds to the controllability of local material properties of the 3D printed item.

It is therefore also desirable to provide a filament which can be used in the herein described method. Therefore, in an aspect of invention the invention provides 3D printable material, especially a filament comprising 3D printable material, wherein the 3D printable material comprises a (host) polymer, especially a thermoplastic material, and dopant material. Such 3D printable material, especially such filament, can be extruded at a temperature lower than the $T_c$ so that the (low temperature) optical property remains the same, or above the $T_c$, such that the (low-temperature) optical property changes (to the high-temperature optical property). In yet a further aspect, the invention provides a filament comprising a first part and a second part, wherein the first part of one or more of the plurality of layers has the low-temperature optical property (which can irreversibly change to the high-temperature optical property when increasing a temperature of the 3D printed material comprising the dopant material over the change temperature $T_c$) and wherein the second part of one or more of the plurality of layers has the high-temperature optical property. Especially, such filament may be extruded at temperatures below the change temperature, though optionally also one or more (first parts) may be extruded at temperatures above the change temperature $T_c$.

Here below, first some general aspects in relation to the principle of change of optical properties are discussed. General aspects in relation to 3D printing are discussed further below.

Controlling of the temperature of the 3D printable material is in general part of the 3D printing method, as the 3D printable material has to be made printable. To this end, 3D printable material may be introduced in a nozzle, heated, extruded from the nozzle, and deposited.

As will be further elucidated below, the 3D printable material (and thus in general also the 3D printed material) comprises a thermoplastic material. In embodiments, the thermoplastic material per se (i.e. without taking into account the dopant material) may be light transmissive, though this is not necessarily the case. As indicated herein, the 3D printable material also comprises a dopant material. The thermoplastic material is a host material for the dopant material. Hence, the polymeric material, especially the thermoplastic material, may also be indicated as "host material" and similar indications.

The transmission of the light transmissive material for one or more wavelengths (in the visible) may be at least 80%/cm, such as at least 90%/cm, even more especially at least 95%/cm, such as at least 98%/cm, such as at least 99%/cm. This implies that e.g. a 1 cm3 cubic shaped piece of light transmissive material, under perpendicular irradiation of radiation having a selected wavelength in the visible, will have a transmission of at least 95%.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

The term "wavelength(s) of interest" may especially refer to one or more wavelengths in the visible.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light. Herein, the term "visible light" especially relates to light having a wavelength selected from the range of 380-780 nm.

The 3D printable material comprises a dopant material. A dopant material may comprise one or more of molecules (dopant molecules) and particles (dopant particles). A dopant material may also comprise a host particle that comprises the dopant material. The host particles may also be indicated as dopant material.

A dopant material may be molecularly dispersed in a thermoplastic material, like e.g. organic dyes dispersed in a thermoplastic material. The term "organic dye" may refer to a dye having a pigment function or to a luminescent dye (which may in specific embodiments also have a pigment function).

A dopant material may also be particulate material, that may be dispersed in a thermoplastic material, like e.g. quantum particles, such as quantum dots and/or quantum rods, etc., metallic flakes, etc. The dopant material may be provided as conglomerate or aggregate of particulate dopant material. A dopant material may also comprise polymer particles comprising molecules or particles. A kind of release particles may be provided that comprise a coating, such as polymeric coating, which encloses molecules or particles. For instance upon increasing the temperature over the change temperature, the coating may at least partly be removed (due to melting or disruption, etc.), and the molecules or particles may be introduced in the surrounding (host) polymer. Hence, in specific embodiments the 3D printable material may comprise dopant material and wherein upon increasing a temperature of the 3D printable material comprising the dopant material over the change temperature $T_c$, molecules come out of dopant material.

The 3D printable material comprising the dopant material has an optical property that irreversibly changes from a low-temperature optical property to a high-temperature optical property when increasing a temperature of the 3D printable material comprising the dopant material over a change temperature $T_c$, wherein the change temperature is within the first temperature range.

In specific embodiments, the optical property may essentially be imposed to the 3D printable material by the dopant material. This may e.g. be in the case of a luminescent dopant material in a light transmissive thermoplastic material or in the case of reflective flakes in a light transmissive thermoplastic material. In yet other embodiments, however, the optical property may be due to the combination of thermoplastic material and dopant material. For instance, this may be the case when the thermoplastic material or the dopant material have a structuring effect on the dopant material or thermoplastic material, respectively.

In embodiments, the dopant material may comprise polymer particles comprising luminescent material comprising molecules which can quench luminescence. Above a critical temperature quenching molecules may penetrate the dopant particles leading to the quenching of luminescence. In embodiments, the particles may also contain molecules which are transparent material which can react with other colorless molecules contained in the transparent matrix (to provide colored molecules). Here again, above a certain temperature mixing of these molecules can take place resulting in a colored appearance. Critical temperature in these examples can be a temperature related to the glass transition temperature of the polymeric material that encloses the molecules and/or particles.

Hence, the phrase "wherein the 3D printable material comprising the dopant material has an optical property", and similar phrases may thus refer to an optical property that changes due to a change of the dopant material, due to a change of the distribution of the dopant material, due to a change of the polymeric host material as function of a reaction of dopant material with the polymeric host material, due to a reaction of a dopant material with another dopant material, etc. etc.

Hence, in embodiments the dopant material may have an optical property that may change. Alternatively or additionally, in embodiments the combination of polymeric (host) material and dopant material may have an optical property that may change. An example of the former may be a change of the color of the dopant material. An example of the latter may be a polymeric host material having a color or having a specific transparency that changes when dopant material is released and e.g. reacts with the polymeric material.

The optical property is especially temperature dependent. Hence, at a first temperature the optical property may be different from the optical property at a second temperature. For instance, color may change, transmission may change, luminescence may change. Especially, the change as function of the temperature is irreversible. Hence, when a certain temperature is exceeded, the optical property may be set in its high-temperature property. A change in the optical property may be due to a degradation, a conformational change, migration of particulate material (increase in homogeneity when increasing temperature, etc.). In specific embodiments, the optical property is selected from the group consisting of reflection, transmission, luminescence, absorption, and color. With temperature, one or more of such optical properties may change. Alternatively, in embodiments with temperature one or more of such optical properties change and one or more other of such optical properties do not change.

For instance, in embodiments at least part of the dopant material may oxidize or degrade when increasing the temperature (above the change temperature). For instance, aluminum may be oxidized to alumina.

For instance, luminescent molecules, such as dyes, or (luminescent) quantum particles may be distributed more homogeneously when increasing the temperature (above the change temperature) which may lead to an increased luminescence.

For instance, a particulate dopant may disintegrate, e.g. into smaller particles, when increasing the temperature (above the change temperature).

For instance, a (particulate) dopant material may be bleached when increasing the temperature (above the change temperature).

For instance, a particulate dopant material may change shape (e.g. bending or shriveling up) when increasing the temperature (above the change temperature).

For instance, quenching molecules may react with luminescent molecules when increasing the temperature (above the change temperature), either due to an increased diffusion or due to a release from a (particulate) polymeric host material.

As during the 3D printing method the temperature may be controlled anyhow, the temperature control can be used to control the 3D printing process but also the optical properties. Hence, especially a dopant material and/or thermoplastic material may be chosen wherein the change in optical property is also within the range of the 3D printing temperatures (of the thermoplastic material). Hence, in embodiments the method may further comprise controlling a first temperature $T_1$ of the 3D printable material within a first temperature range, wherein the change temperature $T_c$ is within the first temperature range.

In general, it may be desirable to actually use the possibility to control the optical property. Hence, in embodiments part of the 3D printed item may have the low-temperature optical property and part of the 3D printed item may have the high-temperature optical property. Hence, in specific embodiments during at least a first part of the 3D printing stage the first temperature $T_1$ is below the change temperature $T_c$, and during at least a second part of the 3D printing stage the first temperature $T_1$ is above the change temperature $T_c$. The term "first temperature $T_1$ below the change temperature $T_c$", and similar terms, may shortly also be indicated as "low temperature". The term "first temperature $T_1$ above the change temperature $T_c$", and similar terms, may shortly also be indicated as "high temperature". The phrase "during at least a first part of the 3D printing stage the first temperature $T_1$ is below the change temperature $T_c$, and during at least a second part of the 3D printing stage the first temperature $T_1$ is above the change temperature $T_c$", and similar phrases, may refer to any order of low and high temperature. Further, during 3D printing there may be a plurality of changes between low and high temperature, or high and low temperature, etc.

Note that in specific embodiments during 3D printing essentially during the entire 3D printing stage the 3D printable material that is 3D printed may have been heated over the change temperature $T_c$. However, in other specific embodiments during 3D printing essentially during the entire 3D printing stage the 3D printable material that is 3D printed may have been processed below the change temperature $T_c$. Especially, however during at least a first part of the 3D printing stage the first temperature $T_1$ is below the change temperature $T_c$, and during at least a second part of the 3D printing stage the first temperature $T_1$ is above the change temperature $T_c$. As indicated above, the first part of the 3D printing stage may be before the second part of the 3D printing stage, but the second part of the 3D printing stage may also be before the first part of the 3D printing stage. Further, the terms "first part" and "second part" may each (independently) refer to a plurality of different first parts and second parts, respectively.

It may be most efficient to keep the 3D printable material below the change temperature $T_c$ during storage and during transport through the 3D printer, and only heat above the change temperature $T_c$ in the nozzle when necessary for depositing 3D printed material having the high-temperature optical property. In this way, flexibility is highest and at a position where the temperature may be highest, the choice can be made to heat above or below the change temperature $T_c$. Hence, in embodiments the method may comprise executing the 3D printing stage with a fused deposition modeling 3D printer, comprising a printer head comprising a printer nozzle, wherein the method comprises controlling the first temperature $T_1$ of the 3D printable material within the printer nozzle. Hence, the printer head may further include a controllable heating element for heating the 3D printable material in the nozzle. Hence, in embodiments in the entire 3D printer the 3D printable material is not heated over the change temperature and only in the printer head the 3D printable material may be heated over the change temperature.

Here below, a number of possible thermoplastic materials are described. However, amongst others good results were obtained with polyethylene or polypropylene based thermoplastic materials. In specific embodiments, the 3D printable material comprises one or more of polyethylene (PE), high-density polyethylene (HDPE), polypropylene (PP), and high-density polypropylene (HDPP). In alternative (or additional) specific embodiments, the 3D printable material comprises one or more of polyethylene (PE), low-density polyethylene (LDPE), polypropylene (PP), and low-density polypropylene (HDPP). In yet further embodiments, the 3D printable material comprise a copolymer of one or more of the afore-mentioned polymers. In yet further embodiments, the 3D printable material comprise copolymers of PP. Yet further, in specific embodiments the printable material comprises in the range of 0.5-30 vol %, such as especially 1-20 vol % of the dopant material, like at least 2 vol %. However, this may depend upon the type of dopant material.

As indicated above, there may be different type of dopants like molecules or particles. The dopants may influence one or more of reflection, transmission, luminescence, absorption, and color of the 3D printable, and thus of the 3D printed material. Reflection may change from a lower to a higher value, or vice versa. Transmission may change from a lower to a higher value, or vice versa. Luminescence may change from a lower to a higher intensity, or vice versa (under the same intensity irradiation with the same wavelength). Absorption may change from a lower to a higher value, or vice versa. Color may change in one or more of hue, saturation, chroma, lightness, and brightness, from a lower to a higher value, or vice versa. Especially, the lowest possible lower value may at least be 10% lower than the highest possible higher value, such as at least 20% lower, like at least 30% lower, especially at least 50% lower. The term "the lowest possible lower value" refers to a value that can be reached with the 3D printing method when relatively low temperatures of the first temperature range are selected.

The term "the highest possible higher value" refers to a value that can be reached with the 3D printing method when relatively high temperatures of the first temperature range are selected and the 3D printable material may be exposed to such temperature at least about 10 seconds (within the printer head, especially the nozzle).

In embodiments, the 3D printable material may be exposed to a higher temperature inside the printer head. Residence time in the printer head may especially be long enough to induce the conversion (to the high-temperature optical property). Residence time may also depend upon how much the temperature is above the Tc. Residence time may be much shorter if the temperature is much above Tc. This will be understood by a person skilled in the art.

Hence, in embodiments the method may further comprise exposing part of the 3D printable material to a first temperature $T_1$ below the change temperature $T_c$, and 3D printing this 3D printable material, and exposing part of the 3D printable material to a second temperature $T_2$ above the change temperature $T_c$, and 3D printing this 3D printable material. As indicated above, the order may be different, and there may be a plurality of one or both of the stages.

The change in optical property may be due to e.g. a change in conformation of the dopant material or the thermoplastic material. A change in optical property may alternatively or additionally be due to e.g. a degradation of the dopant material. A change in optical property may alternatively or additionally be a result of two or materials, such as molecules, reacting or mixing with each other. A change in optical property may alternatively or additionally be due to e.g. a decomposition of the dopant material. A change in optical property may alternatively or additionally be due to change distribution of the dopant material.

Good results were obtained with glitter type particles. It experimentally appeared that these particles lost reflective properties over a specific temperature. Hence, the dopant material comprises polymeric flake-like particles having a metal coating.

In yet further specific embodiments, the dopant material comprises polyethylene terephthalate flake-like particles having an aluminum coating. In embodiments, the polyethylene terephthalate may be biaxially oriented.

The thickness of carrier polymer (of the flake-like particles), such as PET, may be in the range of 10-100 μm. The thickness of the aluminum coating may be selected from the range of e.g. 10-60 nm.

Hence, in specific embodiments the dopant material comprises glitter particles.

In embodiments, the dopant material may comprise flake-like particles having a particle length (L1) and a particle height (L2) with an aspect ratio of L1/L2 of at least 5, such as at least 10, like e.g. selected from the range of 10-1000. It appears useful when such flakes are at least partly aligned in the layers. Hence, in specific embodiments. Hence, in embodiments the dopant material may comprise flake-like particles having a particle length (L1) and a particle height (L2) with an aspect ratio of L1/L2 of at least 5, and wherein the method comprises printing one or more layers of the 3D printed material having a layer height (H), wherein in embodiments the layer height (H) is smaller than the particle length (L2). This lower layer height may especially be useful when the layers are stacked. In embodiments, the layer height (H) is larger than the particle length (L2), when the layers are adjacent (i.e. adjacent layers each having essentially the same height (H)).

As indicated above, a change in optical property may be due to change distribution of the dopant material. For instance, a pigment may be provided as agglomerate of particles which may have a relatively small impact on the color of the 3D printable material (as it is available only at one or more specific locations). Upon heating, the pigment may migrate or diffuse through the polymeric material and change the color of the 3D printable material. In this way, color may change. Or, for instance a luminescent material may be provided as agglomerate of particles which may have a relatively small luminescence due to quenching of the luminescence (e.g. via a reabsorption process); this may apply to luminescent material that show concentration quenching). Upon heating, the luminescent material may migrate or diffuse through the material and thereby the concentration quenching may be reduced. In this way, luminescent properties may change. A change in local concentration may not only affect the luminescent intensity but may in specific embodiments also affect the spectral power distribution of the luminescent material. For instance, for some materials it is known that they reabsorb at higher concentrations and also show a red shift at higher concentrations. When the concentration is locally reduced, the reabsorption may reduce and a blue shift may be perceived. A suitable luminescent material may be an organic luminescent dye, such as a perylene luminescent dyes, like Lumogen (e.g. BASF). A suitable dopant material could be polymer particles, such as PET, hosting or enclosing organic luminescent molecules, such as perylene based organic luminescent material (such as Lumogens, like of BASF). Hence, in specific embodiments the 3D printable material may comprise an inhomogeneous distribution of the dopant material and upon increasing a temperature of the 3D printable material comprising the dopant material over the change temperature $T_c$, the homogeneity of the dopant material increases. The increase in homogeneity may especially be due to an increased mobility of the dopant material. In yet other specific embodiments the 3D printable material may comprise dopant material, such as polymer particles with high concentration of luminescent particles within it, and wherein upon increasing a temperature of the 3D printable material comprising the dopant material over the change temperature $T_c$, the homogeneity of the luminescent molecules and the polymer matrix (dopant material) increases; the luminescent particles may distribute over the polymeric (host) material.

As indicated above, the invention provides a method for producing a 3D item by means of fused deposition modelling, the method comprising a 3D printing stage comprising layer-wise depositing an extrudate comprising 3D printable material, to provide the 3D item comprising 3D printed material (on a receiver item, wherein the 3D item comprises layers of 3D printed material. Further aspect in relation to these features are also elucidated below.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. Optionally, the 3D printable material comprises a 3D printable material selected from the group consisting of Urea formaldehyde, Polyester resin, Epoxy resin, Melamine formaldehyde, thermoplastic elastomer, etc. Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA).

The first temperature range may have a lowest temperature at which the 3D printable material can be extruded. In embodiments, this may be about the glass transition temperature. A highest temperature of the first temperature range may be known to person skilled in the art of 3D (FDM) printing. The first temperature range may be the range wherein the 3D printable material may suitably be extruded. The temperature range may range e.g. about 20-100°, such as 20-50° C. For instance, PP may be e.g. extruded at temperatures selected from the range of 173-225° C. (i.e. about the glass transition temperature +about 50° C.), though other temperatures may be possible.

The term 3D printable material is further also elucidated below, but especially refers to a thermoplastic material, optionally including additives, to a volume percentage of at maximum about 60%, especially at maximum about 30 vol %, such as at maximum 20 vol % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase ("host material" or "polymeric host material"). In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol %, relative to the total volume of the printable material (including the (anisotropically conductive) particles) especially in applications for reducing thermal expansion coefficient. For optical and surface related effect number of particles in the total mixture is equal to or less than 20 vol %, such as up to 10 vol %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. . . . Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. . . . Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structures (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one more post processing actions may be executed after removing the printed item from the receiver item. Post processing may include e.g. one or more of polishing, coating, adding a functional component, etc. . . . Post-processing may include smoothening the ribbed structures, which may lead to an essentially smooth surface.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein. Hence, in an aspect the invention (thus) provides a software product, which, when running on a computer is capable of bringing about (one or more embodiments of) the method (for producing a 3D item by means of fused deposition modelling) as described herein.

The herein described method provides 3D printed items. Hence, the invention also provides in a further aspect a 3D printed item obtainable with the herein described method. In a further aspect a 3D printed item obtainable with the herein described method is provided. Especially, the invention provides a 3D item comprising 3D printed material. As indicated above, the 3D item comprises a plurality of layers of 3D printed material. Further, the 3D printed material comprises a thermoplastic host material and a dopant material in the range of 1-20 vol %, wherein the dopant material comprises polymeric flake-like particles having a metal coating. As indicated above, the 3D printed material comprising the dopant material has an optical property that irreversibly changes from a low-temperature optical property to a high-temperature optical property when increasing a temperature of the 3D printed material comprising the dopant material over a change temperature $T_c$. At least a first part of one or more of the plurality of layers has the low-temperature optical property (which especially can irreversibly change to the high-temperature optical property when increasing a temperature of the 3D printed material comprising the dopant material over the change temperature $T_c$). Additionally, at least a second part of one or more of the plurality of layers has the high-temperature optical property. Hence, especially the invention provides in embodiments a 3D item comprising 3D printed material, wherein the 3D item comprises a plurality of layers of 3D printed material, wherein the 3D printed material comprises a dopant material, wherein the 3D printed material comprising the dopant material has an optical property that irreversibly changes from a low-temperature optical property to a high-temperature optical property when increasing a temperature of the 3D printed material comprising the dopant material over a change temperature $T_c$, wherein at least a first part of one or more of the plurality of layers has the low-temperature optical property (which can irreversibly change to the high-temperature optical property when increasing a temperature of the 3D printed material comprising the dopant material over the change temperature $T_c$,) and at least a second part of one or more of the plurality of layers has the high-temperature optical property.

Hence, the phrase "the 3D printed material may comprise the dopant material that has an optical property that irreversibly changes from a low-temperature optical property to a high-temperature optical property when increasing a temperature of the 3D printed material comprising the dopant material over a change temperature $T_c$" may in embodiments refer to 3D printed material of which a first part of the 3D printed material has the low-temperature temperature optical property and a second part of the 3D printed material has the high-t emperature optical property. In specific embodiments, however, the phrase "the 3D printed material may comprise the dopant material that has an optical property that irreversibly changes from a low-temperature optical property to a high-temperature optical property when increasing a temperature of the 3D printed material comprising the dopant material over a change temperature $T_c$" may in embodiments refer to 3D printed material which only has the low-temperature optical property. Alternatively, the phrase "the 3D printed material may comprise the dopant material that has an optical property that irreversibly changes from a low-temperature optical property to a high-temperature optical property when increasing a temperature of the 3D printed material comprising the dopant material over a change temperature $T_c$" may in embodiments refer to 3D printed material which only has the high-temperature optical property. However, in general the 3D printed material includes a first part of the 3D printed material that has the low-temperature optical property and a second part of the 3D printed material that has the high-temperature optical property. The first part, however, may change to a second part when increasing the temperature over the change temperature $T_c$.

The 3D printed item may comprise a plurality of layers on top of each other, i.e. stacked layers. The width (thickness) and height of (individually 3D printed) layers may e.g. in embodiments be selected from the range of 100-5000 µm, such as 200-2500 µm, with the height in general being smaller than the width. For instance, the ratio of height and width may be equal to or smaller than 0.8, such as equal to or smaller than 0.6.

Layers may be core-shell layers or may consist of a single material. Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated below when discussing the method. Below, some specific embodiments in relation to the 3D printed item are discussed in more detail.

As indicated above, in specific embodiments the 3D printed material may comprise one or more of polyethylene (PE), low-density polyethylene (LDPE), polypropylene (PP), and low-density polypropylene (LDPP), and a copolymer of two or more of these. Especially, the low density variants may have a higher transparency than the high density variants. As indicated above, especially the thermoplastic polymer (without the dopant material) may be light transmissive, or even essentially transparent.

The dopant material comprises polymeric flake-like particles having a metal coating. More especially, the dopant material may comprises polyethylene terephthalate flake-like particles having an aluminum coating.

In specific embodiments, the flake-like particles may have a particle length (L1) and a particle height (L2) with an aspect ratio of L1/L2 of at least 5, such as at least 10. Yet further, in view of aligning the flake-like particles it may be desirable that the layers of one or more of the 3D printed material have a layer height (H), wherein in embodiments the layer height (H) is smaller than the particle length (L2), especially wherein the layers are stacked. When the layers are not stacked, but when the layers are configured adjacent to each other (e.g. to form a layer of e.g. parallel arranged, 3D printed layers), the layer height (H) may especially be larger than the particle length (L2).

The 3D printed material comprises a thermoplastic host material for hosting the dopant material. In specific embodiments the thermoplastic host material of the first part and of the second part are identical, like e.g. both comprising PP or PE. Further, in specific embodiments the printed material comprises in the range of 1-20 vol % of the dopant material. Especially, the volume percentage of the dopant material in the first part and the second part are identical (as they may originate from the same filament). As the different parts may have different optical properties, this may be visible to the user. For instance, transmission, absorption, luminescence, etc. may be different. Hence, in specific embodiments under perpendicular irradiation with a wavelength within the visible wavelength range the wavelength dependent transmission and/or the wavelength dependent reflection differ for the first part and the second part. As indicated above, in embodiments the lowest possible lower value may at least be 10% lower than the highest possible higher value, such as at least 20% lower, like at least 30% lower, especially at least 50% lower (than the highest possible higher value).

Alternatively or additionally, in embodiments one of the first part and the second part has a less homogeneous distribution of the dopant material than the other of the first part and the second part. As indicated above, this may also lead to different optical properties of the first part and the second part.

The (with the herein described method) obtained 3D printed item may be functional per se. For instance, the 3D printed item may be a lens, a collimator, a reflector, etc. . . . The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. . . . The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. . . . Alternatively, or additionally, the functional component may comprise a thermal component (e.g. configured to cool or to heat an electrical component). Hence, the functional component may be configured to generate heat or to scavenge heat, etc. . . .

As indicated above, the 3D printed item maybe used for different purposes. Amongst others, the 3D printed item maybe used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc. . . . In embodiments, the 3D item may be configured as shade. A device or system may comprise a plurality of different 3D printed items, having different functionalities.

With a light source providing light the spectral and/or spatial light distribution of light reflected, transmitted, and/or scattered by different parts (i.e. first and second parts of the 3D printed material) of the 3D printed item may be different. Hence, with the high-temperature optical property or the low-temperature optical property different effects may be created, which may e.g. be useful and/or desirable for a lighting device.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material, and wherein the temperature of the printer nozzle can be controlled. To this end, the 3D printer may comprise a heating element and a control system configured to control the heating element, wherein the heating element is especially configured to heat 3D printable material in the nozzle. For instance, the heating element may be comprised by the printer head.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, and wherein the temperature of the printer nozzle can be controlled. To this end, the 3D printer may comprise a heating element and a control system configured to control the heating element, wherein the heating element is especially configured to heat 3D printable material in the nozzle. For instance, the heating element may be comprised by the printer head.

Especially, the 3D printer comprises a controller (or is functionally coupled to a controller) that is configured to execute in a controlling mode (or "operation mode") the method as described herein. Instead of the term "controller" also the term "control system" (see e.g. above) may be applied.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-3b schematically depict some further aspects of the invention; and

FIG. 4 schematically depicts a lamp or luminaire.

The schematic drawings are not necessarily to scale.

DETAILED DESCRIPTION OF THE EMBODIMENTS

Figure 1A:
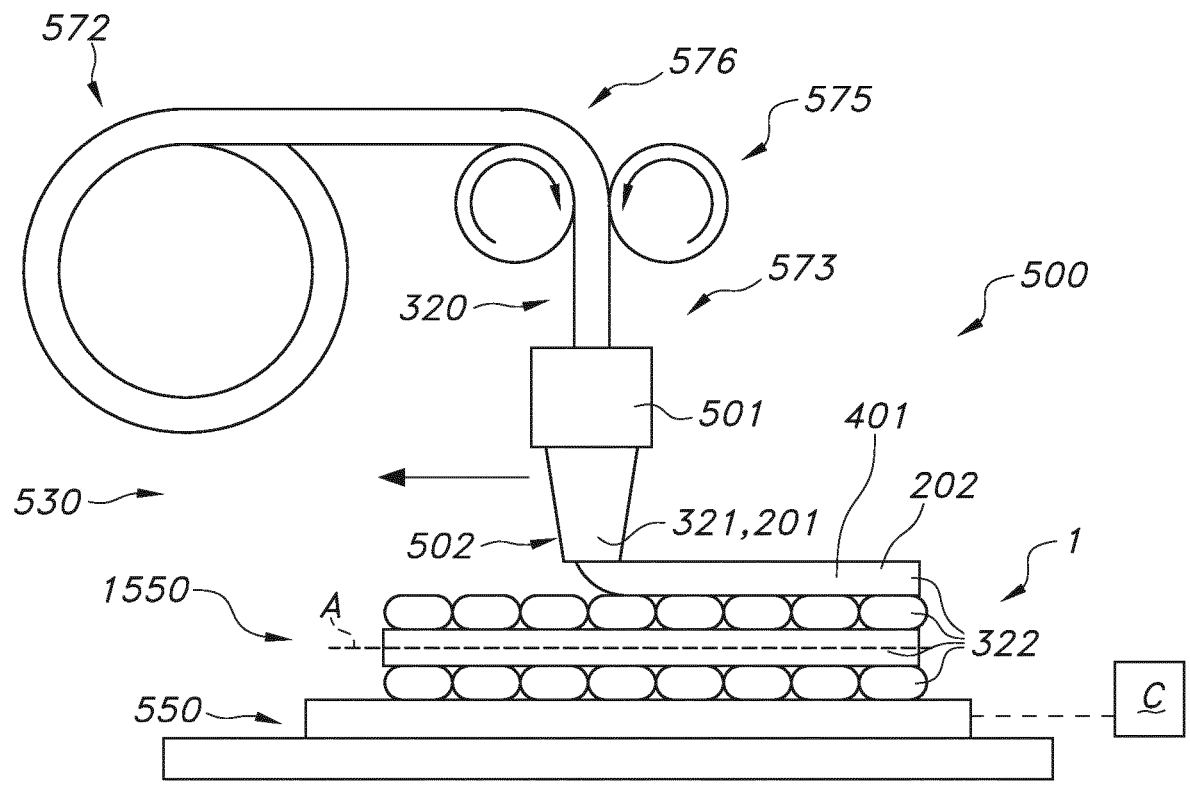
FIGS. 1a-1c schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. The 3D printer of the present invention may especially include a plurality of printer heads (see below). Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layers 322 comprises 3D printable material 201, such as having a melting point $T_m$. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321. Reference 401 indicates thermoplastic material.

The 3D printer 500 may be configured to heat the filament 320 material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322 and/or layer 322t on layer 322, a 3D item 1 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
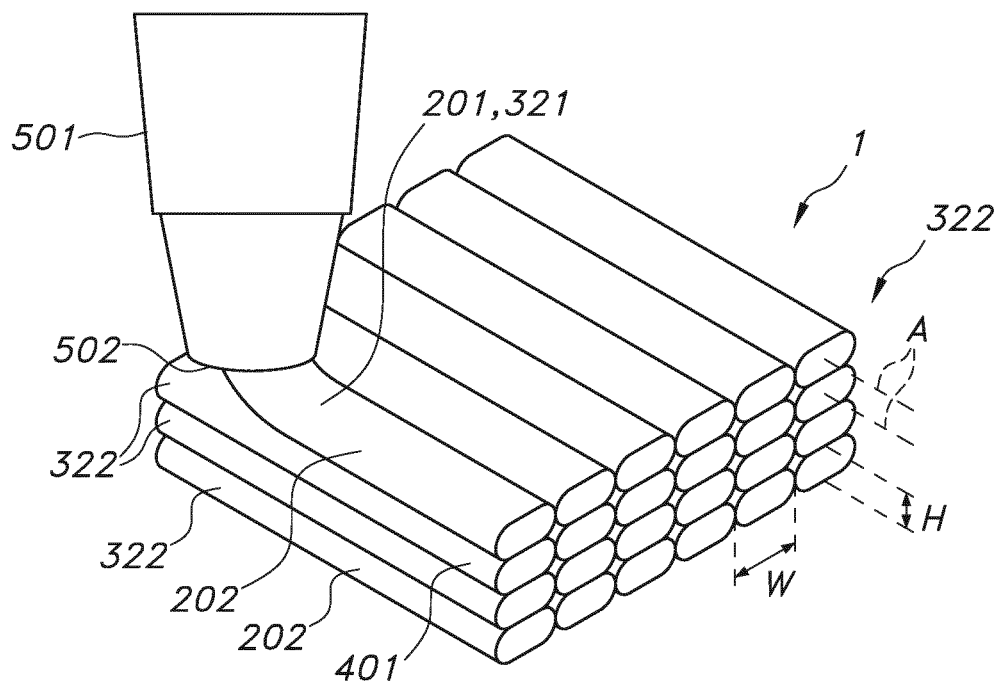

FIG. 1b schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the first or second printable material or the first or second printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
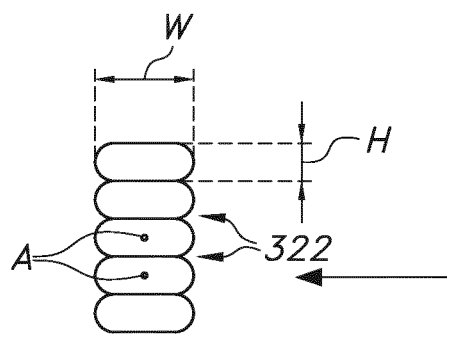

FIG. 1c schematically depicts a stack of 3D printed layers 322, each having a layer height H and a layer width W. Note that in embodiments the layer width and/or layer height may differ for two or more layers 322. Reference 252 in FIG. 1c indicates the item surface of the 3D item (schematically depicted in FIG. 1c).

Referring to FIGS. 1a-1c, the filament of 3D printable material that is deposited leads to a layer having a height H (and width W). Depositing layer 322 after layer 322, the 3D item 1 is generated.

Figure 2A:
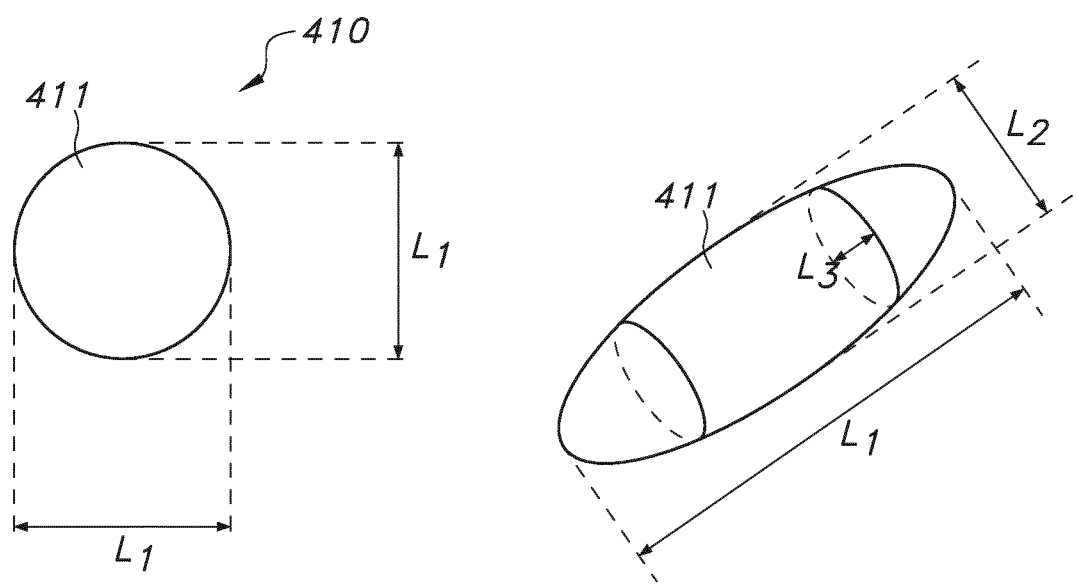
FIG. 2a-2f schematically depict some aspects of embodiments of particles, with some of the shapes being depicted for reference purposes.

FIG. 2a schematically depicts for the sake of understanding particles and some aspects thereof. Note that the particles used in the present invention are especially relative flat, see e.g. FIG. 2d, 2e, FIG. 5, and FIG. 10.

The particles comprise a material 411, or may essentially consist of such material 411. The particles 410 have a first dimension or length L1. In the left example, L1 is essentially the diameter of the essentially spherical particle. On the right side a particle is depicted which has non spherical shape, such as an elongated particle 410. Here, by way of example L1 is the particle length. L2 and L3 can be seen as width and height. Of course, the particles may comprise a combination of differently shaped particles.

Figure 2B:
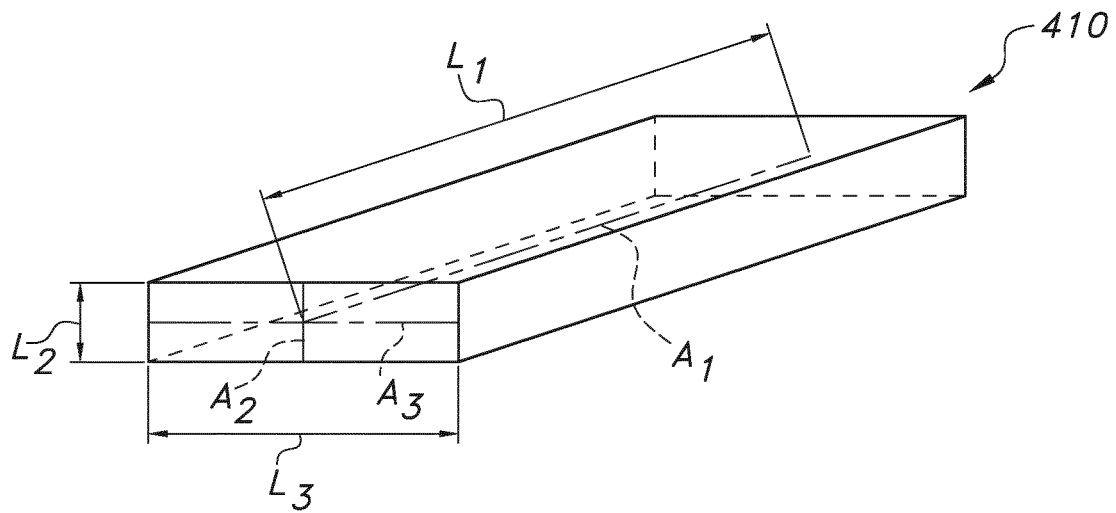

FIGS. 2b-2f schematically depict some aspects of the particles 410. Some particles 410 have a longest dimension A1 having a longest dimension length L1 and a shortest dimension A2 having a shortest dimension length L2. As can be seen from the drawings, the longest dimension length L1 and the shortest dimension length L2 have a first aspect ratio larger than 1. FIG. 2b schematically depicts a particle 410 in 3D, with the particle 410 having a length, height and width, with the particle (or flake) essentially having an elongated shape. Hence, the particle may have a further (minor or main) axis, herein indicated as further dimension A3. Essentially, the particles 410 are thin particles, i.e. L2<L1, especially L2<<L1, and L2<<L3. L1 may e.g. be selected from the range of 5-200 μm; likewise L3 may be. L2 may e.g. be selected from the range of 0.1-20 μm.

Figure 2C:
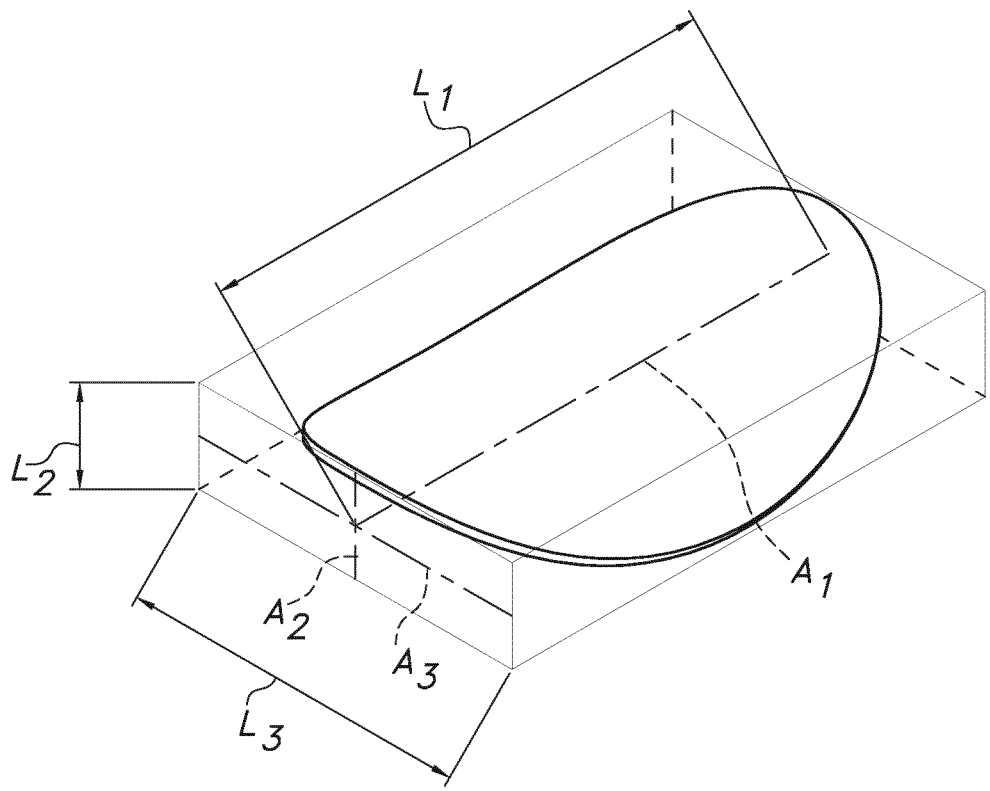

FIG. 2c schematically depicts a particle that has a less regular shape such as pieces of broken glass, with a virtual smallest rectangular parallelepiped enclosing the particle.

Note that the notations L1, L2, and L3, and A1, A2 and A3 are only used to indicate the axes and their lengths, and that the numbers are only used to distinguish the axis. Further, note that the particles are not essentially oval or rectangular parallelepiped. The particles may have any shape with at least a longest dimension substantially longer than a shortest dimension or minor axes, and which may essentially be flat. Especially, particles are used that are relatively regularly formed, i.e. the remaining volume of the fictive smallest rectangular parallelepiped enclosing the particle is small, such as less than 50%, like less than 25%, of the total volume.

Figure 2D:
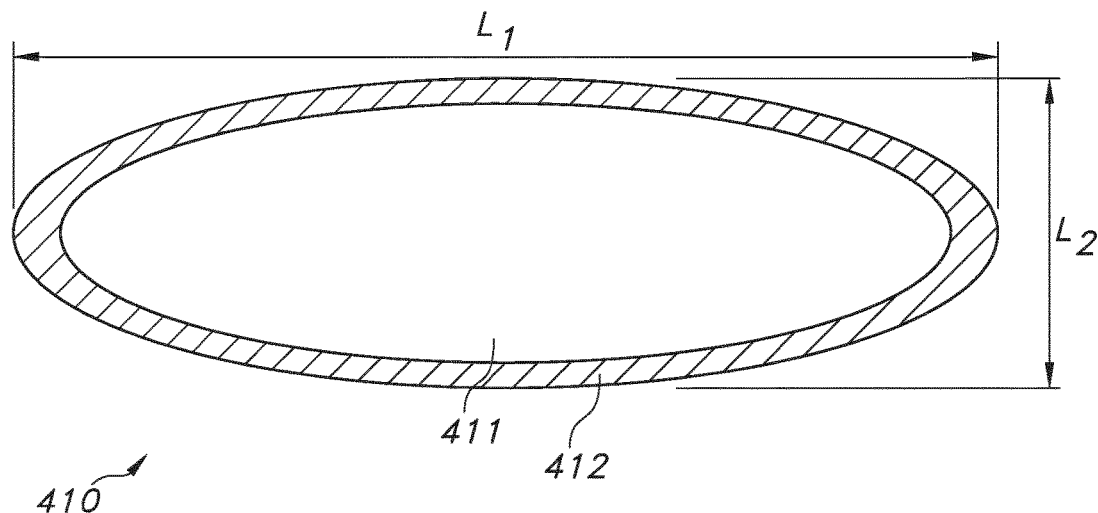

FIG. 2d schematically depicts in cross-sectional view a particle 410 including a coating 412. The coating may comprise light reflective material. For instance, the coating may comprise a (white) metal oxide. In other embodiments, the coating may essentially consist of a metal, such as an Ag coating. In other embodiments the coatings may only be on one or both of the large surfaces and not on the thin side surfaces of the particles.

Figure 2E:
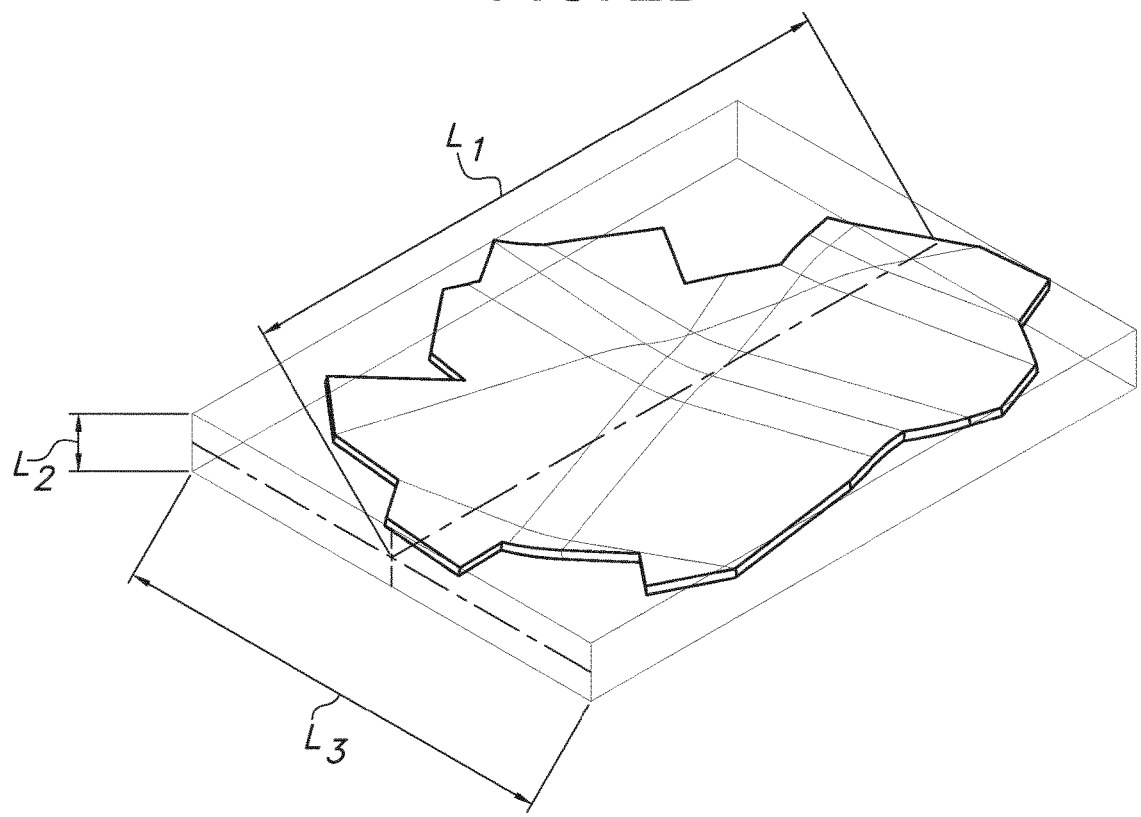

FIG. 2e schematically depicts a relatively irregularly shaped particle. The particulate material that is used may comprise e.g. small broken glass pieces. Hence, the particulate material that is embedded in the 3D printable material or is embedded in the 3D printed material may include a broad distribution of particles sizes. A rectangular parallelepiped can be used to define the (orthogonal) dimensions with lengths L1, L2 and L3.

Figure 2F:
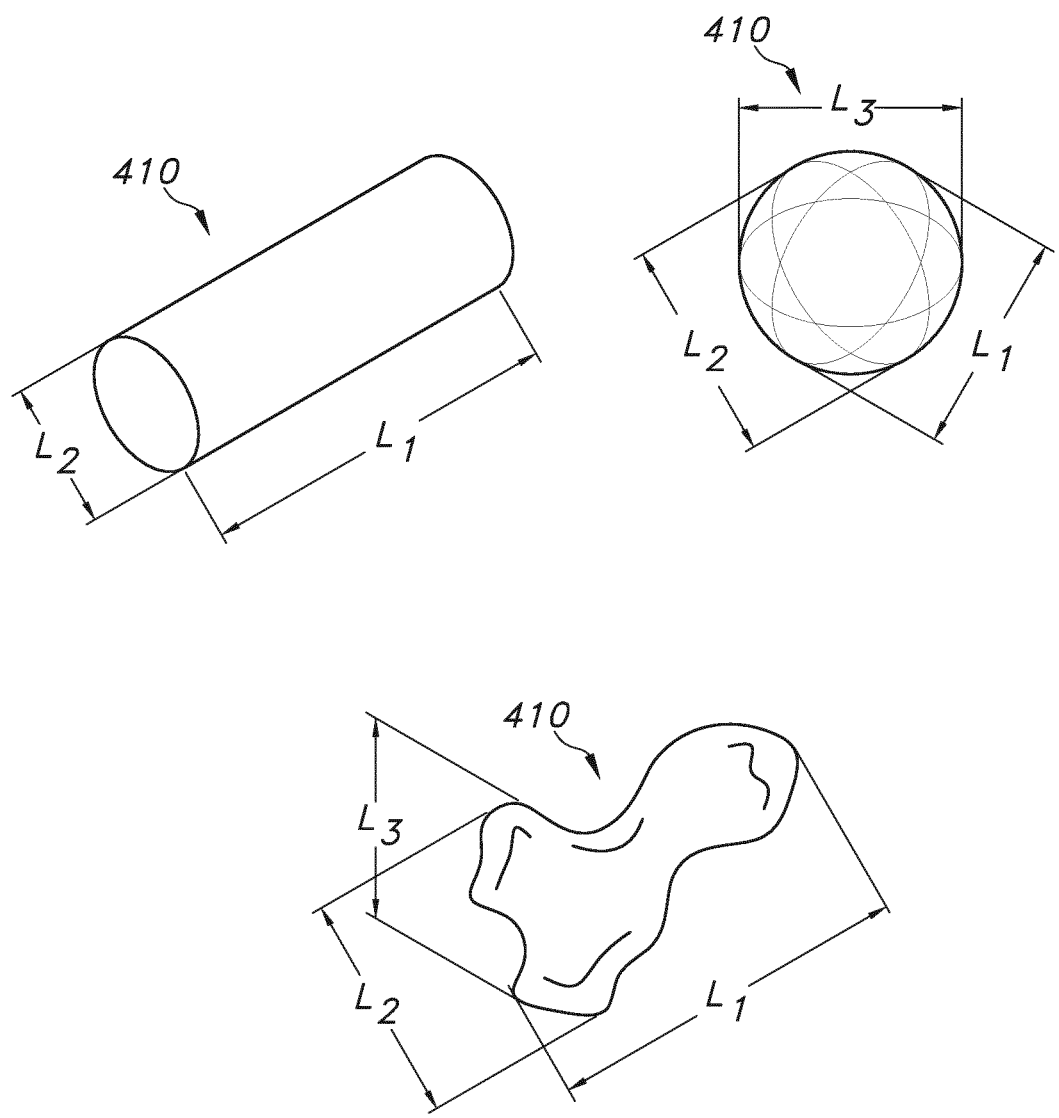

FIG. 2f schematically depicts cylindrical, spherical, and irregularly shaped particles, which will herein in general not be used (see also above).

As shown in FIGS. 2b-2f the terms "first dimension" or "longest dimension" especially refer to the length L1 of the smallest rectangular cuboid (rectangular parallelepiped) enclosing the irregular shaped particle. When the particle is essentially spherical the longest dimension L1, the shortest dimension L2, and the diameter are essentially the same.

FIG. 3a schematically depicts a filament 321, such as when escaping from a printer nozzle (not depicted), which comprises 3D printable material 201. The 3D printable material comprise thermoplastic material 401 with particles 410 embedded therein.

FIG. 3b schematically depicts a 3D item 1, showing the ribbed structures (originating from the deposited filaments), having heights H. This height may also be indicated as width. Here, layers 322 with printed material 202, with heights H and widths W are schematically depicted. FIG. 3b can be seen as a stack of layers 322 of which a plurality adjacent stacks are shown in FIG. 1b.

FIG. 4 schematically depicts an embodiment of a lamp or luminaire, indicated with reference 2, which comprises a light source 10 for generating light 11. The lamp may comprise a housing or shade or another element, which may comprise or be the 3D printed item 1. Here, the half sphere (in cross-sectional view) schematically indicates a housing or shade. The lamp or luminaire may be or may comprise a lighting device 1000 (which comprises the light source 10). Hence, in specific embodiments the lighting device 1000 comprises the 3D item 1. The 3D item 1 may be configured as one or more of (i) at least part of a lighting device housing, (ii) at least part of a wall of a lighting chamber, and (iii) an optical element. Hence, the 3D item may in embodiments be reflective for light source light 11 and/or transmissive for light source light 11. Here, the 3D item may e.g. be a housing or shade. The housing or shade comprises the item part 400. For possible embodiments of the item part 400, see also above.

Figure 5:
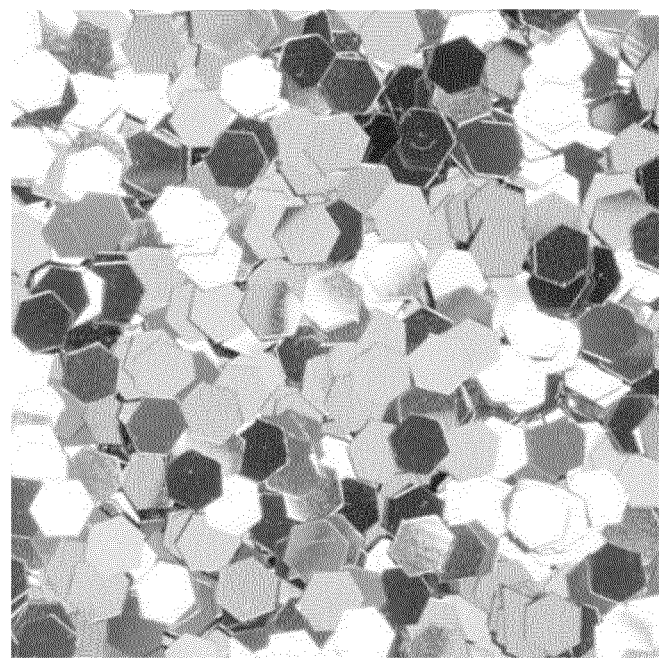
FIG. 5 shows examples of dollar shaped flakes.

FIG. 5 schematically depicts an embodiment of glitters cut into hexagonal shape. They are cut from 12 and 25 μm thick (polyester) foils metalized with aluminum coating (e.g. in the range of about 10-60 nm). They can in embodiments size from about 50 μm up to 3 mm (L1, see also FIG. 2e or 6e).

Figure 6A:
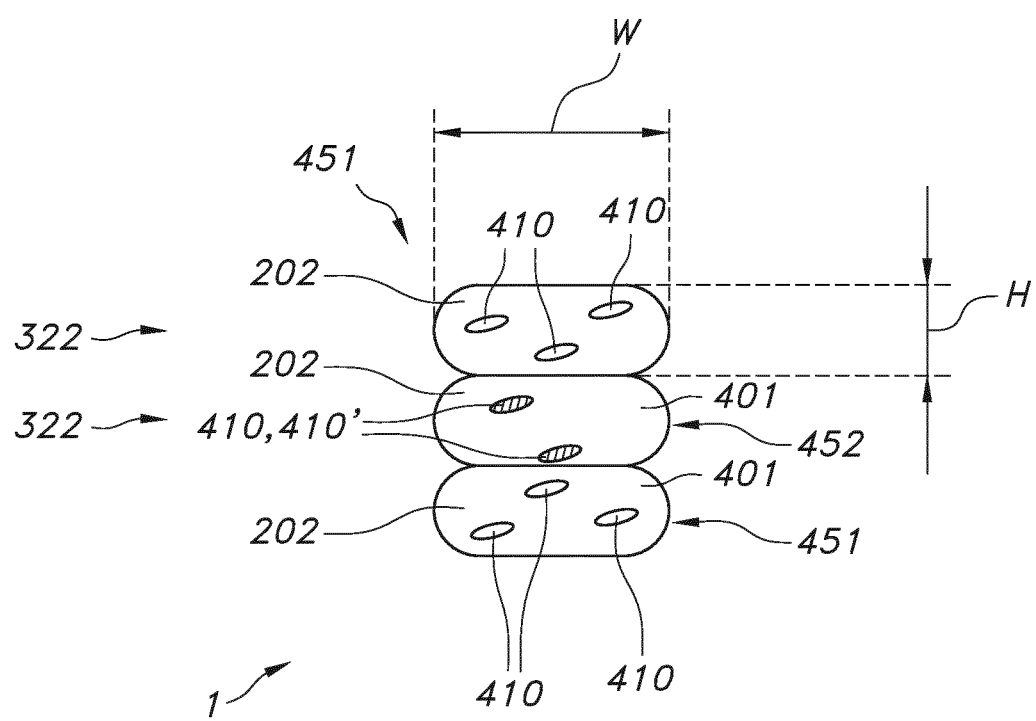
FIGS. 6a-6f schematically depict some aspects and embodiments.

FIG. 6a very schematically depicts an embodiment of a 3D item 1 comprising 3D printed material 202. Here, the 3D item 1 comprises a plurality (by way of example three) of layers 322 of 3D printed material 202.

Here, by way of example each layer of the 3D printed material 202 comprises a dopant material 410. The 3D printed material 202 comprising the dopant material 410 has an optical property that irreversibly changes from a low-temperature optical property to a high-temperature optical property when increasing a temperature of the 3D printed material 202 comprising the dopant material 410 over a change temperature $T_c$. Here, at least a first part 451 of one or more of the plurality of layers 322 has the low-temperature optical property (which can irreversibly change to the high-temperature optical property when increasing a temperature of the 3D printed material 202 comprising the dopant material 410 over the change temperature $T_c$) and at least a second part 452 of one or more of the plurality of layers 322 has the high-temperature optical property. This is very schematically depicted by the bright dopant material particles in the first part 451 and the dark dopant material particles in the second part 452. The latter particles are also indicated with reference 410', to indicate that they may provide the high-temperature optical property.

For instance, the 3D printed material 202 may comprise one or more of polyethylene PE, low-density polyethylene LDPE, polypropylene PP, and low-density polypropylene LDPP or copolymer of PP. For instance, the 3D printed material 202 may comprise a thermoplastic host material 401 for hosting the dopant material 410, wherein the thermoplastic host material 401 of the first part 451 and of the second part 452 are identical, wherein the printed material 202 comprises in the range of 1-20 vol % of the dopant material 410, wherein the volume percentage of the dopant material 410 in the first part 451 and the second part 452 are identical, wherein under perpendicular irradiation with a wavelength within the visible wavelength range the wavelength dependent transmission and/or the wavelength dependent reflection differ for the first part 451 and the second part 452.

The optical property may be selected from the group consisting of reflection, transmission, luminescence, absorption, and color.

Figure 6B:
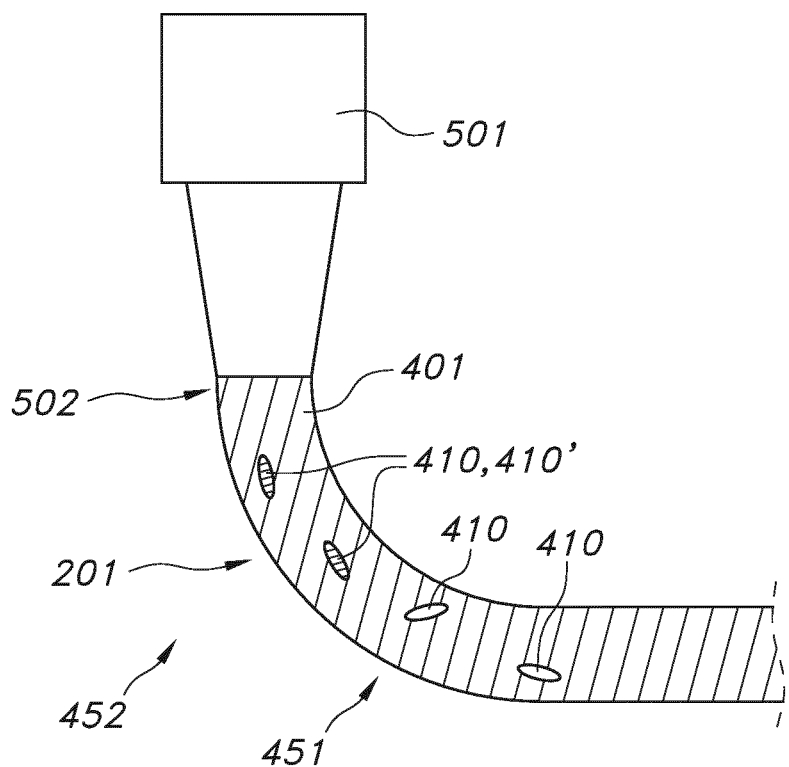

FIG. 6b very schematically depicts an embodiment of 3D printable material 201 being expelled from the nozzle 502, wherein also different parts are available. Hence, very schematically FIG. 6b also depicts (at least part of) a method for producing a 3D item 1 by means of fused deposition modelling, the method comprising a 3D printing stage comprising layer-wise depositing an extrudate 321 comprising 3D printable material 201, to provide the 3D item 1 comprising 3D printed material 202, wherein the 3D item 1 comprises layers 322 of 3D printed material 202, wherein the method further comprises controlling a first temperature T1 of the 3D printable material 201 within a first temperature range, wherein the 3D printable material 201 comprises a dopant material 410, wherein the 3D printable material 201 comprising the dopant material 410 has an optical property that irreversibly changes from a low-temperature optical property to a high-temperature optical property when increasing a temperature of the 3D printable material 201 comprising the dopant material 410 over a change temperature Tc, wherein the change temperature $T_c$ is within the first temperature range, wherein during at least a first part of the 3D printing stage the first temperature T1 is below the change temperature Tc, and wherein during at least a second part of the 3D printing stage the first temperature T1 is above the change temperature Tc.

For instance, the 3D printable material 201 comprises one or more of polyethylene PE, high-density polyethylene HDPE, polypropylene PP, and high-density polypropylene HDPP, wherein the printable material 201 comprises in the range of 1-20 vol % of the dopant material 410.

Figure 6C:
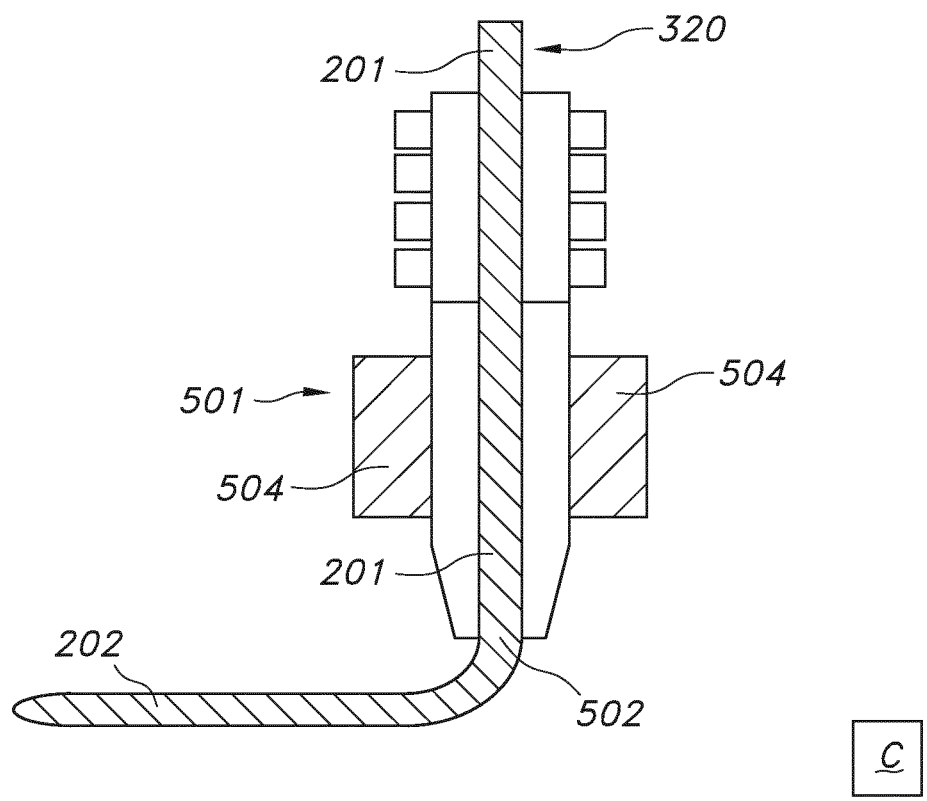

FIG. 6c very schematically depicts an embodiment of the method comprises executing the 3D printing stage with a fused deposition modeling 3D printer 500, comprising a printer head 501 comprising a printer nozzle 502, wherein the method comprises controlling the first temperature $T_1$ of the 3D printable material 201 within the printer nozzle 502.

Reference 504 indicates a heating element. The heating element 504 may be controlled by the control system C. The heating element 504 is especially used to heat 3D printable material 201 in the printer nozzle 502. The printable material 201 is schematically indicated. Filament 320 may be introduced into the printer head 501.

Figure 6D:
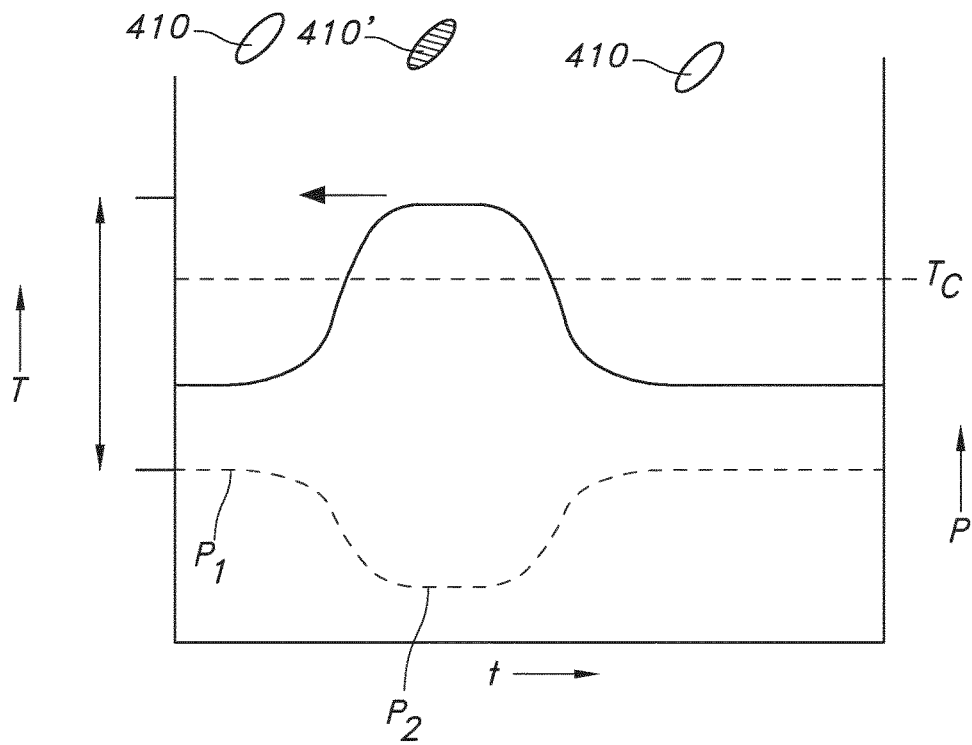

FIG. 6d very schematically depicts e.g. the temperature (left y-axis) in the nozzle 502 over time. When increased over the change temperature, another optical property (value) may be obtained. This is schematically depicted with the particles 410 and 410', and also very schematically with the parameter P (right y-axis) which also changes with temperature. The arrow on the left y-axis indicates the first temperature range.

Figure 6E:
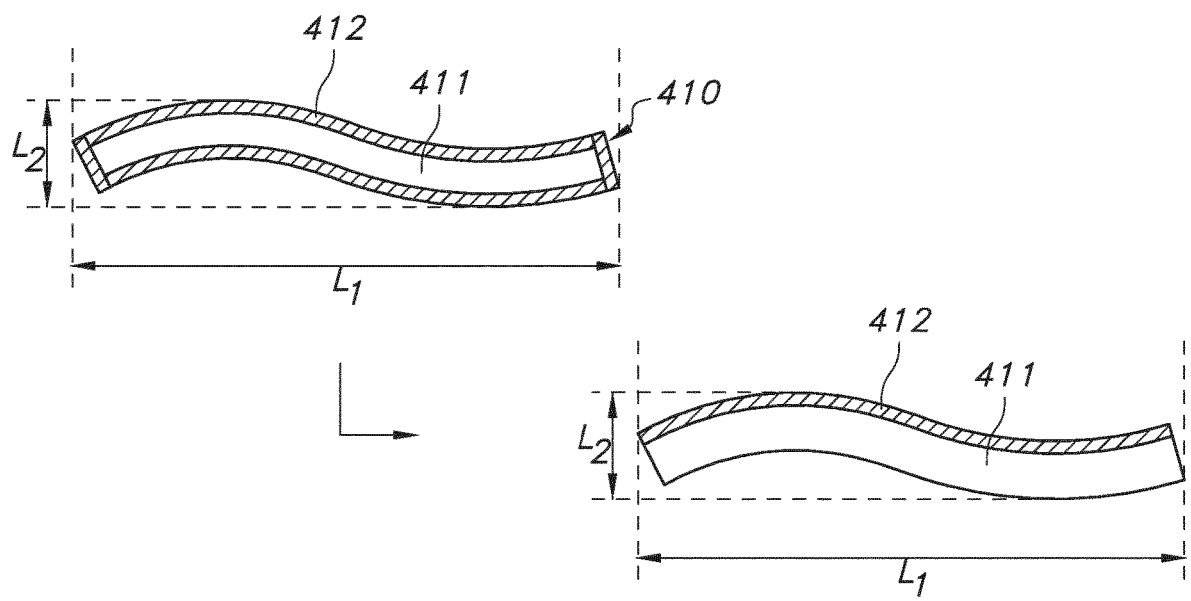

Referring to FIG. 6e, in embodiments the dopant material 410 comprises polymeric flake-like particles having a metal coating. Reference 411 indicate support material, such as the polymeric material, like e.g. (biaxially oriented) PET film, and reference 412 indicates coating material, such as aluminum. Hence, in embodiments the dopant material 410 comprises polyethylene terephthalate flake-like particles having an aluminum coating can be applied. As schematically depicted, the metal coating may be only on one side, but may also be conformal.

Referring to e.g. FIGS. 6a and 6e, the dopant material 410 comprises may polymeric flake-like particles having a metal coating, especially wherein the dopant material 410 comprises polyethylene terephthalate flake-like particles having an aluminum coating, wherein the flake-like particles have a particle length L1 and a particle height L2 with an aspect ratio of L1/L2 of at least 5, wherein the layers 322 of one or more of the 3D printed material 202 have a layer height H, wherein the layer height H is smaller than the particle length L2. In alternative embodiments, the layer height H may be larger than the particle length L2.

Figure 6F:
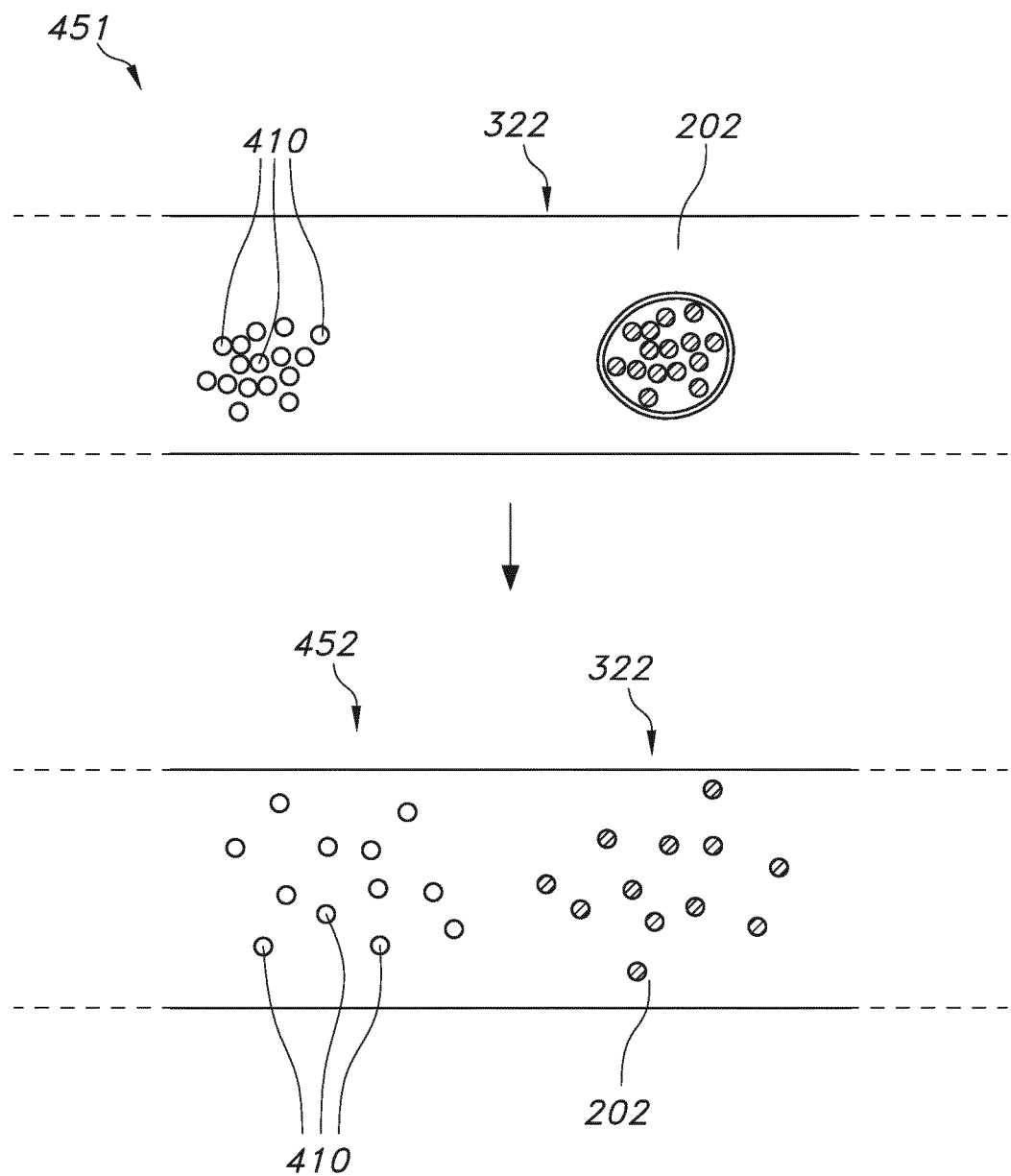

FIG. 6f schematically indicates an embodiment wherein due to an increase of temperature a second part may be formed (from a first part). Here, one of the first part 451 and the second part 452 has a less homogeneous distribution (here the first part) of the dopant material 410 than the other of the first part 451 and the second part 452 (here the second part). Hence, homogeneity may increase upon increasing the temperature which may lead to a change of the optical property or optical properties. On the left, an agglomerate of particles (or molecules) is schematically depicted, where the particles (or molecules) become more homogeneously distributed upon increasing the temperature (from upper to lower drawing). On the right, a (dopant) particle comprising dopant material is depicted, which upon increasing the temperature over the change temperature may be freed from the particle, by which a more homogeneous distribution is obtained. It may also be that the freed particles (or molecules) may react with other particles or molecules, by which an optical property may change.

Hence, very schematically (especially on the left) also a method is depicted wherein the 3D printable material comprises an inhomogeneous distribution of the dopant material 410 and wherein upon increasing a temperature of the 3D printable material 201 comprising the dopant material 410 over the change temperature $T_c$, the homogeneity of the dopant material 410 increases, e.g. due to an increased mobility of the dopant material 410.

In embodiments, the dopant material 410 comprise one or more of quantum dots, luminescent molecules embedded in polymeric particles.

Glitters are a class of materials which can give attractive appearance to luminaires. Glitters may be produced by cutting PET films with a thin layer of aluminum into flat particles with a precise size and shape. The films may also have microstructures giving glitters an extra attractive appearance. We tried to produce filaments of polymers such as polycarbonate with glitters at processing temperatures above 200° C. However, it was observed that at such elevated temperatures the glitters lost their attractive reflective appearance. When we used polymers such as polypropylene which can be processed below 200° C. we could produce filaments with glitters for FDM printing. The filaments were then used in FDM to produce objects with glitters.

Here, amongst others in embodiments it is proposed to use polymers with a viscosity <5000 Pa·s at shear rate 1 s$^{-1}$ at 180° C. (in the case of crystalline polymers melting temperature below 200° C.). We found that polyalkenes such as polypropylene and polyethylene are especially suitable material for producing FDM filaments with glitters.

In order to produce glitters in a polymer we used polypropylene and added glitters of various sizes into the polymer. After extruding the material at 190° C. filaments for FDM printing could be produced. The thickness of the glitters was 12 micron and had lateral with hexagon shape having dimensions 50×50, 100×100, 200×200, 400×400 micrometer. Using these flakes, we printed various shapes. When the layer height of the FDM prints it was chosen to be lower than the lateral dimensions of the glitters it was found that the glitters were oriented mainly in the plane of the printed showing highly reflective decorative appearance. We also used the filaments to print a cylinder. During printing, the temperature in the nozzle was also altered and the printing took place at 240° C. and 190° C. The areas printed at 190° C. the glitters are intact and they have a reflective appearance. In the other areas printed at 240° C. the glitters become destroyed during printing and the shiny appearance disappeared. Thus, by changing the temperature during printing one can change the appearance of the printed object and locally bring in patterns.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention also provides a control system that may control the apparatus or device or system, or that may execute the herein described method or process. Yet further, the invention also provides a computer program product, when running on a computer which is functionally coupled to or comprised by the apparatus or device or system, controls one or more controllable elements of such apparatus or device or system.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

As indicated above, glitters may typically be flat particles of e.g. PET with a relatively thin aluminum coating. Filaments of printable thermoplastic polymers that comprise glitters as an additive have been produced and used. 3D printing of such filaments is done at elevated temperatures, with the exact processing temperature being dependent on the thermoplastic polymer. For polycarbonate, the processing temperature is above 200° C., and the inventors observed that at such elevated temperatures the glitters may lose their attractive reflective appearance. This was not observed for polymers that can be processed below 200° C. Suitable polymers are e.g. polyalkenes, such as polypropylene and polyethylene. When during printing the temperatures are increased to above 200° C., the reflective appearance of the glitters can be "switched off".

The invention claimed is:

1. A method for producing a 3D item by means of fused deposition modelling, the method comprising a 3D printing stage comprising layer-wise depositing an extrudate comprising 3D printable material, to provide the 3D item comprising 3D printed material, wherein the 3D item comprises layers of 3D printed material,
    wherein the method further comprises controlling a first temperature $T_1$ of the 3D printable material within a first temperature range,
    wherein the 3D printable material comprises:
    a thermoplastic host material, and
    a dopant material in the range of 1-20 vol. %, the dopant material comprising polymeric flake-like particles having a metal coating,
    wherein the dopant has an optical property that irreversibly changes from a low-temperature optical property to a high-temperature optical property when increasing a temperature of the dopant over a change temperature $T_c$, the optical property being selected from the group consisting of reflection, transmission, luminescence, absorption, and color,
    wherein the change temperature $T_c$ is within the first temperature range, wherein during at least a first part of the 3D printing stage the first temperature $T_1$ is below the change temperature $T_c$, and
    wherein during at least a second part of the 3D printing stage the first temperature $T_1$ is above the change temperature $T_c$.

2. The method according to claim 1, wherein the method comprises executing the 3D printing stage with a fused deposition modeling 3D printer, comprising a printer head comprising a printer nozzle, wherein the method comprises controlling the first temperature $T_1$ of the 3D printable material within the printer nozzle.

3. The method according to claim 1, wherein the thermoplastic host material comprises one or more of polyethylene (PE), low-density polyethylene (LDPE), polypropylene (PP), and low-density polypropylene (LDPP), or a copolymer of two or more of these.

4. The method according to claim 1, wherein the dopant material comprises polyethylene terephthalate flake-like particles having an aluminum coating.

5. The method according to a claim 1, wherein the dopant material comprises flake-like particles having a particle length and a particle height with an aspect ratio of L1/L2 of at least 5, and wherein the method comprises printing one or more layers of the 3D printed material having a layer height (H), wherein the layer height (H) is smaller than the particle length, and wherein the layers are stacked.

6. The method according to claim 1, wherein the dopant material comprise one or more of quantum particles, organic luminescent molecules, and luminescence quenching molecules.

7. The method according to claim 1, wherein the dopant when the temperature is increased above the change temperature $T_c$: (1) disintegrates into smaller particles, (2) is bleached, (3) oxidize or degrade or (4) changes shape, including bending or shriveling up.

8. A method for producing a 3D item by means of fused deposition modelling, the method comprising a 3D printing stage comprising layer-wise depositing an extrudate comprising 3D printable material, to provide the 3D item comprising 3D printed material, wherein the 3D item comprises layers of 3D printed material,
    wherein the method further comprises controlling a first temperature $T_1$ of the 3D printable material within a first temperature range,
    wherein the 3D printable material comprises:
    a thermoplastic host material, and
    a dopant material in the range of 1-20 vol. %, the dopant material comprising polymeric flake-like particles having a metal coating, wherein the dopant material provides a glitter optical property to the 3D printable material,
    wherein the dopant material's glitter optical property irreversibly changes from a low-temperature first glitter optical property to a high-temperature a second or non-glitter optical property when increasing a temperature of the dopant material over a change temperature $T_c$,
    wherein the change temperature $T_c$ is within the first temperature range, wherein during at least a first part of the 3D printing stage the first temperature $T_1$ is below the change temperature $T_c$, and
    wherein during at least a second part of the 3D printing stage the first temperature $T_1$ is above the change temperature $T_c$.

* * * * *